United States Patent

[11] 3,587,439

| | | |
|---|---|---|
| [72] | Inventor | Jacques Mercier<br>Billancourt, France |
| [21] | Appl. No | 790,390 |
| [22] | Filed | Jan. 10, 1969 |
| [45] | Patented | June 28, 1971 |
| [73] | Assignees | Regie National Des Usines Renault<br>Billancourt (Hauts de Seine), France;<br>Automobiles-Peugeot<br>Paris, France |
| [32] | Priority | Jan. 23, 1968 |
| [33] | | France |
| [31] | | 137,074 |

[54] AUTOMOTIVE AIR-VENT AUTOMATIC CONTROL SYSTEMS
7 Claims, 3 Drawing Figs.

[52] U.S. Cl. .................................................... 98/2
[51] Int. Cl. .................................................... B60h 1/24
[50] Field of Search ................................ 98/2, 2.1, 2 (F.C.)

[56] References Cited
UNITED STATES PATENTS

| 2,694,970 | 11/1954 | Schneider .................. | 98/2 |
| 3,387,549 | 6/1968 | Cutelet ........................ | 98/2 |

*Primary Examiner*—Meyer Perlin
*Attorney*—Stevens, Davis, Miller And Mosher

ABSTRACT: A device for automatically controlling the movable louvre of an air vent in a ventilation system of an automotive vehicle, wherein said louvre is controlled by means of a mechanical transmission connected to the movable member of a vacuum cylinder of which the suction chamber communicates with the suction orifice of a Venturi tube having its convergent small section directed towards the relative wind.

INVENTOR
JACQUES MERCIER

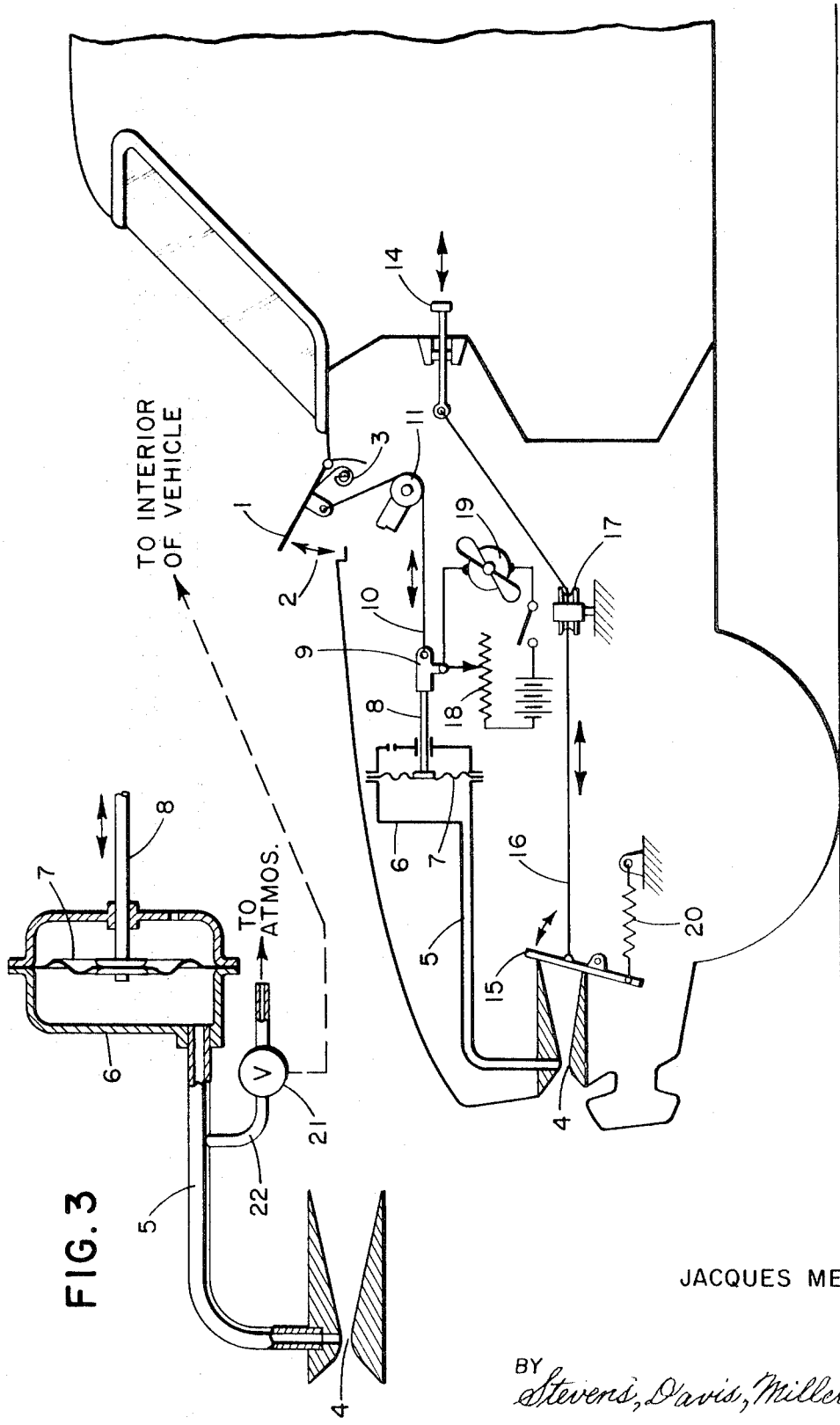

AUTOMOTIVE AIR-VENT AUTOMATIC CONTROL SYSTEMS

This invention is concerned with a device for automatically controlling an air vent louvre of automotive vehicle as a function of the vehicle's speed in relation to the atmospheric air.

Various devices for automatically controlling the ventilation or heating system of a vehicle have already been proposed which are responsive to the vehicle's speed in relation to the ambient air, and a typical example of a device of this character is described and illustrated notably in the French Pat. No. 1,285,410 filed on January 13, 1961 by Société d'Etudes et d'Applications Industrielles, Commerciales et Immobilières "Inter-Technique".

In this prior art patent the device is intended essentially for starting and stopping a fan or booster and possibly adjusting its velocity of rotation in order to maintain a sufficient air input to the car's interior through an inlet or air vent disposed at the front of the vehicle. This device consists of a diaphragm member responsive to the pressure exerted by the relative wind at a selected point of the vehicle, this diaphragm actuating a multiposition contactor electrically connected to the fan motor.

This device is operative only at relatively high air pressure values and is inadequate for actuating a louvre or flap controlling the air flowing under the wind pressure into the car's interior, unless a very elaborate system is used. Moreover, its operation requires a considerable amount of electric power and constitutes an appreciable additional load both for the electrical equipment and for the engine of the vehicle.

It is the object of the present invention to provide a device capable of automatically adjusting the input rate of the air penetrating into a vehicle as a function of its relative speed with respect to the surrounding atmosphere, this adjustment device operating without consuming any power supplied from the vehicle. This device for automatically controlling a movable or hinged louvre associated with an air vent incorporated in the ventilation system of an automotive vehicle is characterized in that the louvre is controlled by means of a mechanical transmission connected to the movable member of a vacuum cylinder of which the suction chamber communicates with the lateral suction orifice of a Venturi inlet tube.

Of course, the Venturi tube is mounted on the vehicle with its small convergent section directed forwards, i.e. towards the relative wind developed by the vehicle speed.

According to a specific form of embodiment, said movable member of the vacuum cylinder, which may consist of a piston or a flexible diaphragm, is connected through one or a plurality of rods pivoted to the hinged louvre normally urged by a counterweight or a spring to its open position.

This transmission may also consist of a cable guided by means of one or more guide pulleys.

Advantageously, a control lever connected to one element of said transmission is provided for actuating said movable member of said hinged louvre in order to enable the user to modify at will the conditions of operation of the vacuum cylinder. The same result may be obtained or completed by using a throttle valve properly positioned with respect to the Venturi tube, preferably at the end or outlet of the divergent section thereof, said throttle valve being controlled by means of said control lever. The conditions of operation of said vacuum cylinder may also be controlled by inserting a valve in a branch line of the suction circuit.

The device may also advantageously be completed by controlling by means of said vacuum cylinder the ON, OFF and variable-speed positions of switch means associated with an electric fan incorporated in the air-conditioning system of the vehicle.

Other features characterizing this invention will appear as the following description proceeds with reference to the annexed drawings of which:

FIG. 2 is a first alternate embodiment; and

FIG. 3 is a second alternate embodiment.

Figure 1:
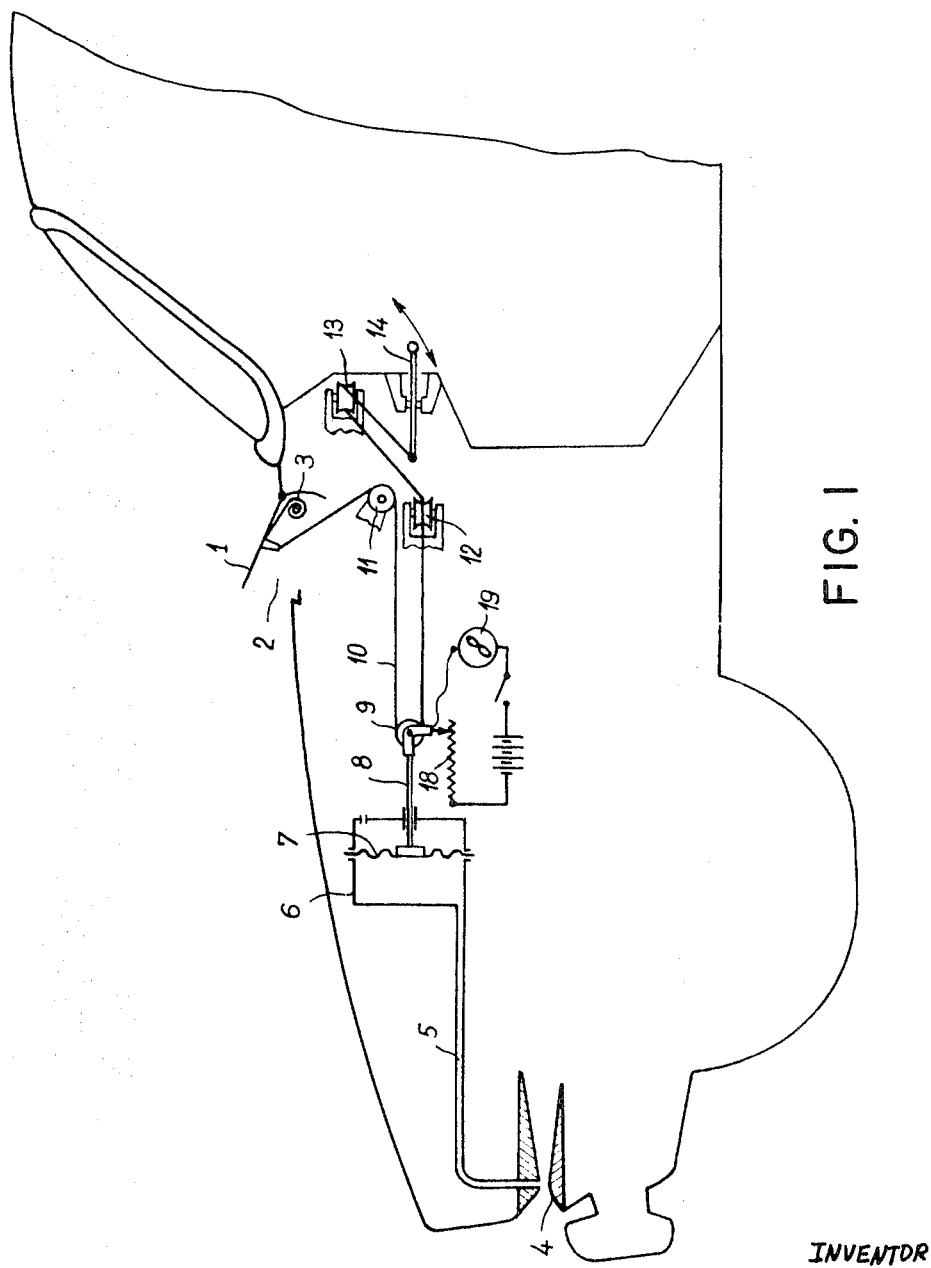
FIG. 1 is a diagrammatic illustration of a typical embodiment of the invention.

As the purpose of these drawings consists simply in illustrating the general principle of the device constituting the subject matter of this invention, they show only the general outline of a vehicle equipped with this device; the dimensions and relative positions of the component elements of this device are given by way of example only and should not be construed as limiting the invention.

A hinged louvre or like movable flap 1 disposed in front of the windscreen is adapted to be raised or lowered at its front end to open or close an air vent 2 for supplying a ventilation system (not shown). This louvre 1 is normally urged to its open position by a spring 3. At the front end of the vehicle a Venturi tube 4 is mounted, its lateral suction orifice being connected through a pipe 5 to a suction cylinder 6 provided with a flexible diaphragm 7 having its marginal portions rigid with the cylinder wall and its central, movable portion connected via a sliding rod 8 to the strap or the pivot pin of a pulley 9 movable in the axial direction of said rod 8. A cable 10 passing over said pulley 9 and over fixed guide pulleys 11, 12 and 13 constitutes a transmission between said movable pulley 9 and therefore the suction cylinder diaphragm 7 and the hinged louvre 1. A manual adjustment control lever 14 connected to the free end of cable 10 permits modifying at will the initial setting of the device by moving said louvre 1 between its open and fully closed position.

As an alternative as shown in FIG. 2, this adjustment modification may be obtained if desired by using a throttle valve 15 urged to its closed position by a spring 20 and controlling the output of the Venturi tube 4. In this case a cable 16 passing over a fixed pulley 17 constitutes a transmission between the control lever 14 and the throttle valve 15. In this case, the free end of cable 10 is not passed over the guide pulleys 12 and 13 but is either anchored to a fixed point or attached directly to the sliding rod 8 of vacuum cylinder 6.

According to another modification of this invention, as shown in FIG. 3, the adjustment may be altered at will by a valve 21 in the branch line 22 of pipe 5, this valve being controlled by the driver of the vehicle.

This device operates as follows:

When the vehicle is still the louvre 1 is open and held in this position by spring 3. When the vehicle is being driven the vacuum produced by the Venturi tube as a function of the relative air speed exerts a suction on the flexible diaphragm 7 so as to move the central portion thereof and thus carry along the pulley 9; under these conditions, the louvre 1 is closed in proportion to the relative air speed.

If the air-conditioning system of the vehicle comprises a motor-driven fan 19 the fan operation may be controlled automatically as a function of the position of said flexible diaphragm 7. It is only necessary to connect to the rod 8 the movable member (sliding contact, etc...) of a quick or gradual current control or cutoff device 18 such as a rheostat or switch inserted in the fan motor energizing circuit. Of course, this circuit may comprise a rheostat and an ON-OFF switch mounted in series.

I claim:

1. A ventilation system for an automotive vehicle comprising an air vent; a movable louvre having a front and a rear end with respect to the movement of said vehicle, said louvre being hinged at its rear end and adapted to have its front end raised exteriorly of said vehicle and lowered to respectively open and close said air vent of said system; a vacuum cylinder having a vacuum chamber closed by a movable wall, mechanical transmission means operatively connecting said movable wall to said louvre for controlling its raising and lowering according to the moving of said wall; a Venturi tube having a vacuum section preceding a convergent inlet turned in the direction of said vehicle movement to receive ram air, said vacuum section communicating with said vacuum chamber.

2. A ventilation system according to claim 1, further comprising a fan driven by an electric motor, said movable wall being connected to a movable member of at least one means capable of selectively energizing and deenergizing said motor.

3. A ventilation system according to claim 1 further comprising spring means biasing said louvre to its open position, said transmission means comprising a cable operatively connecting said louvre to said movable wall of said cylinder.

4. A ventilation system according to claim 3 further comprising a sliding rod one end of which is connected to said movable wall and the other end of which is provided with a pulley over which said cable is passed, said cable having one end attached to said louvre and the other end anchored to a fixed point.

5. A ventilation system according to claim 3 further comprising a sliding rod one end of which is connected to said movable wall and the other end of which is provided with a pulley over which the cable is passed, said cable having one end attached to said louvre and the other end connected to an adjustment member adapted to move said other end by pulling same.

6. A ventilation system according to claim 1 further comprising a shutter on said Venturi tube and adapted to be controlled by means of an adjustment member.

7. A ventilation system according to claim 1 further comprising an adjustment valve adapted to be actuated from inside the vehicle and mounted at the outlet end of a branch line connected with said vacuum chamber.